UNITED STATES PATENT OFFICE.

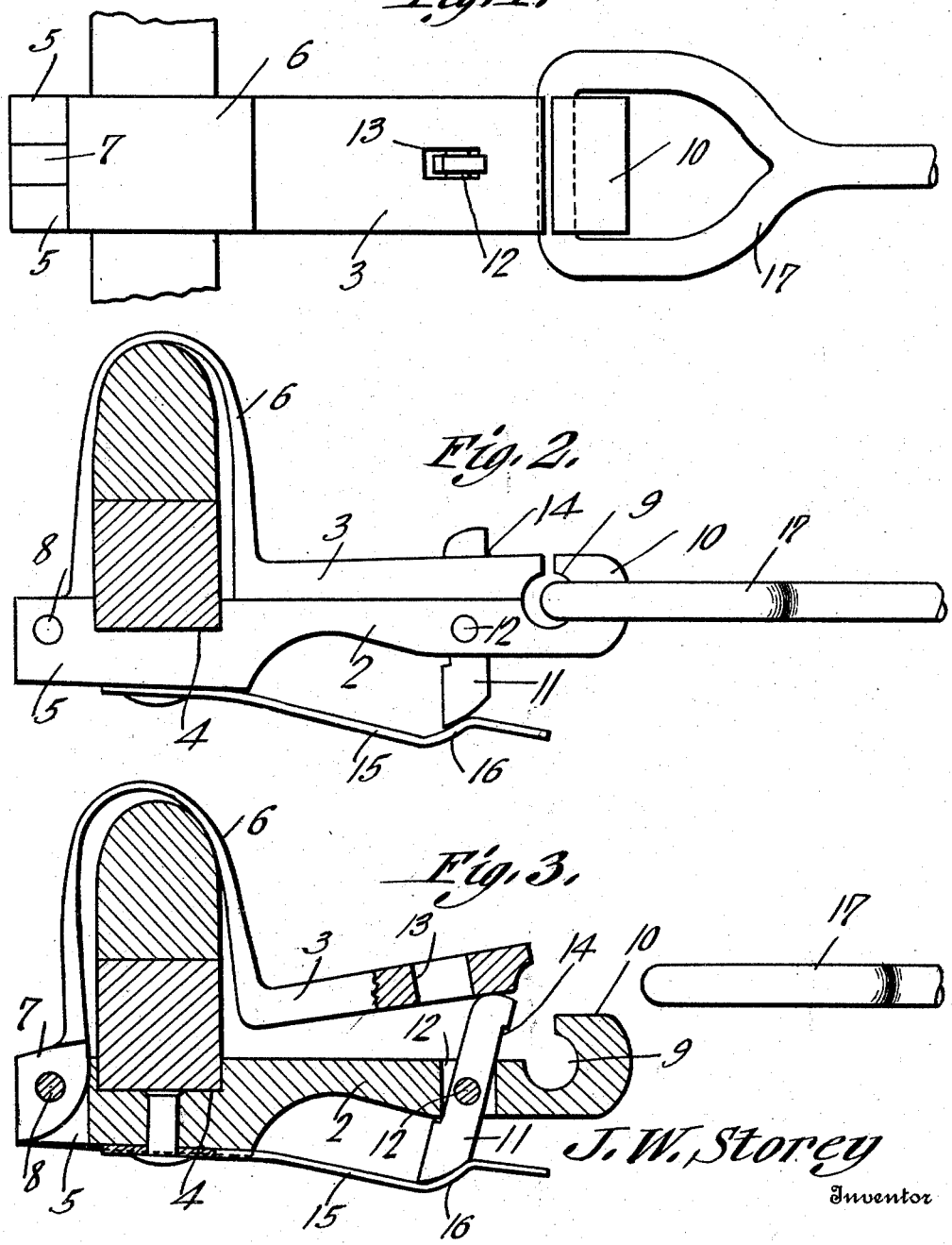

JOHN W. STOREY, OF ATTALLA, ALABAMA.

SHAFT-COUPLING.

1,308,307.   Specification of Letters Patent.   Patented July 1, 1919.

Application filed March 20, 1919. Serial No. 283,705.

*To all whom it may concern:*

Be it known that I, JOHN W. STOREY, a citizen of the United States, residing at Attalla, in the country of Etowah and State of Alabama, have invented a new and useful Shaft-Coupling, of which the following is a specification.

This invention relates to improvements in shaft couplers for vehicles, the object of the invention being to provide an improved coupler of this character by means of which the shafts of a vehicle can be quickly and easily changed without requiring the removal of bolts or any other fastening means and which coupler I have termed a "quick shift shaft coupler."

A further object of the invention is the provision of a device of the character set forth in which the coupling members are positively and reliably locked in shaft-holding position by means of a spring-controlled trigger which may be released by the pressure of the thumb and finger of the operator respectively upon the trigger and spring.
A further object of the invention is the provision of means which serves to secure the coupling members on the axle of the vehicle and at the same time lock the shaft to the coupling members.
With these and other objects in view, which will appear as the description proceeds, the invention consists in the novel features of construction and combination of parts all of which will be more fully described hereinafter and finally pointed out in the claims.

In the drawing acompanying and forming part of this specification,

Figure 1 is a plan view of my improved shaft coupler, showing the same applied to the axle of a vehicle, the axle being broken away;

Fig. 2 is a side view showing the coupler with the trigger drawn forward to release the shaft; and Fig. 3 is a sectional view showing the coupler released.

The same characters of reference designate the same parts in the different figures of the drawing.

In the embodiment of the invention herein illustrated, 2 designates the lower coupling mmber and 3 the upper coupling member. The member 2, which may be termed the base member, is formed from a comparatively heavy piece of metal and is provided adjacent its rear end with a crosswise extending recess 4 adapted to be seated on the upper side of the axle of a vehicle. This member 2 is also bifurcated at its rear end to provide a pair of perforated ears 5. The upper member 3 is formed adjacent its rear end so as to provide a bow-shaped portion 6 registering with the recess 4 in the base member 2, this bow-shaped portion being adapted to fit over and tightly engage the wooden piece that is usually placed on the upper side of the axle, thereby to secure such wooden piece and the axle between the base member and the bow-shaped portion 6 of the upper member. This member 3 is also provided at its rear end, adjacent to said bow-shaped portion, with a perforated lug 7 adapted to fit between the ears 5 carried by the base member 2 and pivoted thereto by means of a pivot pin 8 passing through the perforations of said lug and ears, whereby a hinge connection between the members 2 and 3 is obtained, the corners of the lug 7 being rounded to permit the member 3 to be swung upwardly on its pivot.

Forward of the recess 4 and bow-shaped portion 6, the members 2 and 3 are adapted to lie in close contact and at their forward ends to coöperate to form a means for pivotally securing the end of a shaft. For this purpose the members 2 and 3 are provided with mating portions so formed that when locked together in the manner hereinafter described a circular opening, as shown at 9, is formed between them. The member 2 is provided at its forward end with a hook-shaped portion 10 having formed therein the larger part of said circular opening, while the end of the member 3 is adapted to abut against the end of such hook-shaped portion and formed so as to complete the circular opening when the members are brought together.

For the purpose of securely locking the members 2 and 3 together, I have provided a trigger latch, shown in the present instance as comprising a trigger 11 pivoted at 12 in a slot passing through the base member 2 a short distance back of the hook-shaped portion of said member, the upper portion of the trigger being adapted to pass through a slot 13 in the upper member 3 and having a wedge-shaped notch 14 in its forward edge of a length approximately equal to the thickness of the member 3 at this point, whereby the upper wall of said notch is adapted to fit over the upper side of the member 3 and thereby hold the same against swinging movement on its pivot. The base member 2 is cut away or made thinner forward of the recess 4, and the trigger is shown as extending below the lower side of said base member. In the present instance spring means is provided for holding the trigger 11 in locking position, and as herein shown such spring means comprises a flat spring 15 secured by means of a rivet to the under side of the thicker portion of the member 2, said member being slightly recessed for the reception of the spring thereby to prevent shifting thereof, and this spring extends forwardly below the member 2, and at the point where it underlies the end of the trigger the spring is bent or offset, as shown at 16, so as to contact with such trigger and exert pressure thereon thereby to force the lower end of the trigger backwardly, the trigger being rounded at its lower end to assist such action, whereby the notched upper end of the trigger is held in locking engagement with the member 3.

In the operation of the device, the members 2 and 3 are placed over the axle with the under side of the axle resting in the recess 4 and the wooden piece in the bow-shaped portion 6. The usual loop 17 carried by the end of the shaft is then placed in the open hook-shaped end of the member 2 and the member 3 pressed downward on the base member 2, with the upper end of the trigger projecting through the slot 13, whereupon the spring will act on the lower end of the trigger and thereby force the notch 14 into engagement with the upper member 3 in a manner which will be readily understood, whereby the member 3 is securely locked against swinging on its pivot. When it is desired to unlock the members 2 and 3 for changing the shafts or for any other purpose, all that is necessary is for the operator to place his thumb on the free end of the spring 15 and exert a slight downward pressure thereon, at the same time placing his finger back of the trigger and pulling it forward in the same manner as the trigger of a gun, whereupon the trigger will release the upper member 3 and the latter may be swung on its pivot so as to release not only the shaft, but also the axle if for any reason it is desired to remove the coupler from the axle. It will thus be seen that I have provided a comparatively simple device by means of which the same means which secures the coupler to the axle also secures the shaft to the coupler, and which means can be released by the mere pulling of a trigger.

While I have described in detail the structure herein illustrated, it is to be understood that I do not thereby limit my invention to the precise features of construction shown, as I am aware that many mechanical changes may be made without departing from the spirit and scope of the invention as set forth in the appended claims.

Having thus described my invention, what I claim is:

1. A device of the class described, comprising a pair of members adapted to be secured to a vehicle axle and having coöperating means for pivotally securing the shaft of a vehicle, and a single spring-actuated means for securing said members to the vehicle axle and the shaft to said members.

2. A device of the class described, comprising a pair of members pivotally secured together and adapted to clamp a vehicle axle between them, said members having cooperating means for pivotally securing the shaft of a vehicle, and a spring-controlled trigger for locking said members in axle and shaft engaging position.

3. A device of the class described, comprising a member adapted to underlie a vehicle axle, a member pivoted to said first member and adapted to overlie the axle, the ends of said members opposite said pivotal connection being formed to pivotally secure between them the end of a vehicle shaft, a trigger pivotally mounted in one of said members and having means for engaging the other of said members thereby to secure the members in shaft-locking position, and a spring secured to one of said members and adapted to retain said trigger in its locking position.

In testimony that I claim the foregoing as my own, I have hereto affixed my signature in the presence of two witnesses.

JOHN W. STOREY.

Witnesses:
 LOUISE SMITH,
 STEPHEN CULBERT, Jr.